(12) United States Patent
Ting et al.

(10) Patent No.: US 12,467,862 B2
(45) Date of Patent: Nov. 11, 2025

(54) OPTICAL ANALYSIS SYSTEM AND OPTICAL ANALYSIS METHOD

(71) Applicant: MEGA CRYSTAL BIOTECHNOLOGY SINGAPORE PTE. LTD., Singapore (SG)

(72) Inventors: Yi-Sheng Ting, New Taipei (TW); Kuo-Wei Hsu, Taoyuan (TW)

(73) Assignee: MEGA CRYSTAL BIOTECHNOLOGY SINGAPORE PTE. LTD., Singapore (SG)

( * ) Notice: Subject to any disclaimer, the term of this patent is extended or adjusted under 35 U.S.C. 154(b) by 144 days.

(21) Appl. No.: 18/377,308

(22) Filed: Oct. 6, 2023

(65) Prior Publication Data

US 2024/0118199 A1 Apr. 11, 2024

(30) Foreign Application Priority Data

Oct. 7, 2022 (TW) .................................. 111138268

(51) Int. Cl.
*G01N 21/39* (2006.01)
(52) U.S. Cl.
CPC .................................. *G01N 21/39* (2013.01)
(58) Field of Classification Search
CPC ........... G01N 21/39; G01N 2021/1757; G01N 2021/399; G01N 2201/0691; G01N 2201/12792; G01N 21/27; G01N 21/35; G01J 3/0205; G01J 3/0254; G01J 3/0297; G01J 3/42; G01J 2003/104; G01J 2003/106; G01J 3/10
USPC ......................................................... 356/326
See application file for complete search history.

(56) References Cited

U.S. PATENT DOCUMENTS

| | | |
|---|---|---|
| 2011/0069094 A1 | 3/2011 | Knapp |
| 2012/0229798 A1 | 9/2012 | Mocnik |
| 2016/0377530 A1 | 12/2016 | Barrett |
| 2021/0255085 A1 | 8/2021 | Souchkov |

FOREIGN PATENT DOCUMENTS

CN 104936353 6/2017

*Primary Examiner* — Md M Rahman
(74) *Attorney, Agent, or Firm* — Winston Hsu

(57) ABSTRACT

An optical analysis system and an optical analysis method, which simply change driving electric currents of light-emitting units via using a control and process unit, so that a wavelength range and a peak wavelength of an irradiated light generated by each light-emitting unit may be fine-tuned. A plurality of irradiating lights with different wavelength ranges and peak wavelengths are irradiated to the object to be tested in different times, so that merely fewer light-emitting units may be used to improve a detection resolution and a detection accuracy of a spectrum of the object to be tested.

28 Claims, 10 Drawing Sheets

OPTICAL ANALYSIS SYSTEM AND OPTICAL ANALYSIS METHOD

BACKGROUND OF THE INVENTION

1. Field of the Invention

The present invention relates to the technical field of an optical analysis system and an optical analysis method, and in particular to an optical analysis system and to an optical analysis method for use in improving a detection resolution and a detection accuracy of a spectrum of an object to be tested. In the optical analysis system and in the optical analysis method, different driving electric currents drive each light-emitting unit to fine-tune the wavelengths range and peak wavelengths of the irradiating lights which each light-emitting unit generates, and in the optical analysis system and in the optical analysis method a plurality of irradiating lights of different peak wavelengths irradiate the object to be tested in different times, thereby improving the detection resolution of the spectrum of the object to be tested.

2. Description of the Prior Art

A current optical analysis method uses a mercury lamp or a neon lamp to provide irradiating lights of a wide wavelength range to detect the spectrum of an object to be tested. After the irradiating lights irradiate the object to be tested, they generate transmitted lights which pass through the object to be tested or reflected lights which are reflected by the object to be tested. Then, the detection signals generated by an optical receiver are analyzed to obtain the spectrum of the object to be tested (i.e., the analysis results of the object to be tested) after the optical receiver is used to receive the transmitted lights or the reflected lights. However, the above approach may easily cause the object to be tested to heat up, lead to the deterioration of the object to be tested and/or a decrease in detection accuracy.

Another current optical analysis method is to replace the mercury lamp or the neon lamp with a light source device including a plurality of light-emitting diodes, and use light-emitting diodes of different wavelength ranges to produce a plurality of irradiating lights of different peak wavelengths to irradiate the object to be tested to produce the detection lights. However, the above approach still has technical problems such as insufficient detection resolution and/or possible deterioration of the object to be tested. Furthermore, in the above-mentioned optical analysis methods, the irradiating lights may have thermal drift of the peak wavelengths caused by temperature factors, thereby reducing the detection accuracy. On the other hand, in addition to the increase in cost, what is more troublesome is that the light-emitting diodes with different peak wavelengths may cause each irradiating light influence one another because the spectra of the irradiating lights has double peaks (a main peak and a secondary peak) although more light-emitting diodes of different peak wavelengths may be used to increase the detection resolution of the spectrum of the object to be tested. Therefore, the detection accuracy of the above-mentioned current optical analysis methods is still not ideal and needs further improvement.

Therefore, the present invention explains how to effectively improve the above-mentioned problems of the current optical analysis methods and of the optical analysis systems by innovative hardware designs, and there is a need for developers and related researchers in related industries to continue to overcome and solve the problems.

SUMMARY OF THE INVENTION

In view of these, an objective of the present invention is to provide an optical analysis system and an optical analysis method which improve the detection resolution and the detection accuracy of the spectrum of the object to be tested, which is possible without introducing a large number of additional light-emitting units to fine-tune the wavelength ranges and peak wavelengths of the irradiating lights of each light-emitting unit by varying driving electric currents to irradiate the object to be tested with irradiating lights of different wavelength ranges and peak wavelengths in different times, thereby improving the detection resolution and the detection accuracy of the spectrum of the object to be tested.

Based on at least one objective of the present invention, some embodiments of the present invention provide an optical analysis system. The optical analysis system includes a light source device, a first optical receiver and a control processing unit, wherein the control processing unit is electrically connected to the light source device and to the first optical receiver. The light source device includes a first light-emitting unit and a second light-emitting unit, wherein a first driving electric current and a second driving electric current respectively drive the first light-emitting unit to emit a first irradiating light and a second irradiating light, and a third driving electric current and a fourth driving electric current respectively drive the second light-emitting unit to emit a third irradiating light and a fourth irradiating light. A first peak wavelength to a fourth peak wavelength corresponding to the first irradiating light to the fourth irradiating light are different from one another, and a first wavelength range to a fourth wavelength range corresponding to the first irradiating light to the fourth irradiating light are different from one another, wherein the light source device respectively emits the first irradiating light to the fourth irradiating light to irradiate the object to be tested at a first time to a fourth time to respectively generate a first detection light to a fourth detection light. The first optical receiver respectively receives the first detection light to the fourth detection light at the first time to the fourth time to generate a first detection signal to a fourth detection signal. The control processing unit is used to control the light source device and generate analysis results of the object to be tested according to the first detection signal to the fourth detection signal. The first time is not equal to the second time, and the third time is not equal to the fourth time.

Further, in some embodiments of the present invention, the first light-emitting unit emits light at a first on-off frequency, and the second light-emitting unit emits light at a second on-off frequency, wherein the first on-off frequency and the second on-off frequency are the same or different from each other.

Further, in some embodiments of the present invention, the first on-off frequency and the second on-off frequency are between 0.05 time/second and 50,000 times/second.

Further, in some embodiments of the present invention, the time interval of the first on-off frequency and of the second on-off frequency for turning on the first light-emitting unit and second light-emitting unit is between 0.00001 second and 10 seconds, and the time interval of the first on-off frequency and of the second on-off frequency for turning off the first light-emitting unit and second light-emitting unit is between 0.00001 seconds and 10 seconds.

Further, in the embodiment of the present invention, a peak wavelength difference value between adjacent two of the first peak wavelength to the fourth peak wavelength is greater than or equal to 1 nm and less than or equal to 80 nm.

Further, in some embodiments of the present invention, a peak wavelength difference value between adjacent two of the first peak wavelength to the fourth peak wavelength is greater than or equal to 5 nm and less than or equal to 80 nm.

Further, in the embodiment of the present invention, a peak wavelength difference value between adjacent two of the first peak wavelength to the fourth peak wavelength is greater than or equal to 0.5 nm.

Further, in some embodiments of the present invention, a full width at half maximum (FWHM) which at least one of the first peak wavelength to the fourth peak wavelength corresponds to is greater than 0 nm and less than or equal to 60 nm.

Further, in some embodiments of the present invention, a full width at half maximum (FWHM) which at least one of the first peak wavelength to the fourth peak wavelength corresponds to is greater than or equal to 15 nm and less than or equal to 50 nm.

Further, in some embodiments of the present invention, a full width at half maximum (FWHM) which at least one of the first peak wavelength to the fourth peak wavelength corresponds to is greater than or equal to 15 nm and less than or equal to 40 nm.

Further, in some embodiments of the present invention, each one of the first light-emitting unit and the second light-emitting unit is a light-emitting diode, a vertical-cavity surface-emitting laser (VCSEL) or a laser diode.

Further, in some embodiments of the present invention, the first detection light to the fourth detection light are a first reflected light to a fourth reflected light or a first transmitted light to a fourth transmitted light respectively generated by the first detection light to the fourth detection light to irradiate the object to be tested.

Further, in some embodiments of the present invention, the optical analysis system further includes a uniformly mixing/splitting element and a second optical receiver. The uniformly mixing/splitting element is used to receive every one of the first irradiating light to the fourth irradiating light and generate a part of every one of the first irradiating light to the fourth irradiating light for the first optical receiver to receive and another part of every one of the first irradiating light to the fourth irradiating light. The second optical receiver is electrically connected to the control processing unit, and is used to receive another part of every one of the first irradiating light to the fourth irradiating light, and thereby generating a first reference signal to a fourth reference signal, wherein the control processing unit generates the analysis results of the object to be tested according to the first reference signal to the fourth reference signal and to the first detection signal to the fourth detection signal.

Further, in some embodiments of the present invention, the uniformly mixing/splitting element is a shielding plate, the shielding plate is disposed between the light source device and the object to be tested and has a light-transmitting hole to allow the part of every one of the first irradiating light to the fourth irradiating light to pass through to irradiate the object to be tested, wherein the second optical receiver is disposed at a side of the shielding plate to face the light source device.

Further, in some embodiments of the present invention, the uniformly mixing/splitting element is an optical integrating sphere, the optical integrating sphere includes a light entrance, a first light exit and a second light exit; the first optical receiver is aligned with the first light exit, and the second optical receiver is aligned with the second light exit, wherein every one of the first irradiating light to the fourth irradiating light enters the optical integrating sphere by the light entrance, a part of the first irradiating light to the fourth irradiating light exits by the first light exit, and another part of the first irradiating light to the fourth irradiating light exits by the second light exit.

Further, in some embodiments of the present invention, the uniformly mixing/splitting element includes a spectroscope set including one or more spectroscopes, the spectroscope set receives the first irradiating light to the fourth irradiating light, and the spectroscope set emits a part of the first irradiating light to the fourth irradiating light for the first optical receiver to receive and emits another part of the first irradiating light to the fourth irradiating light for the second optical receiver to receive.

Further, in some embodiments of the present invention, the object to be tested receives a part of every one of the first irradiating light to the fourth irradiating light to generate the first detection light to the fourth detection light, and the optical analysis system further includes a second optical receiver. The second optical receiver is electrically connected to the control processing unit, and is used to receive another part of every one of the first irradiating light to the fourth irradiating light, thereby generating the first reference signal to the fourth reference signal, wherein the control processing unit generates the analysis results of the object to be tested according to the first reference signal to the fourth reference signal and to the first detection signal to the fourth detection signal.

Further, in some embodiments of the present invention, the control processing unit which respectively divide the first detection signal to fourth detection signal by the first reference signal to the fourth reference signal calculates a first ratio to a fourth ratio, and generates the analysis results of the object to be tested according to the first ratio to the fourth ratio.

Further, in some embodiments of the present invention, the control processing unit further includes a variable gain amplification device. The control processing unit is configured to a first gain to a fourth gain for use in amplifying the first detection signal to the fourth detection signal according to the first reference signal to the fourth reference signal, and the variable gain amplification device is used to amplify the first detection signal to the fourth detection signal according to the first gain to the fourth gain. The control processing unit generates the analysis results of the object to be tested according to the amplified first detection signal to the amplified fourth detection signal.

Further, in some embodiments of the present invention, the variable gain amplification device further includes a programmable resistor, and the programmable resistor changes the gain of the variable gain amplifier device via using the control processing unit.

Further, in some embodiments of the present invention, the control processing unit further includes a Fourier transform device. The first detection signal to the fourth detection signal forma time domain measurement signal of the object to be tested. The Fourier transform device converts the time domain measurement signal of the object to be tested to a frequency domain measurement signal of the object to be tested, and the control processing unit obtains a spectral signal of the object to be tested to serve as the analysis results of the object to be tested after the control processing unit filters out noise from the frequency domain measurement signal of the object to be tested.

Based on at least one objective of the present invention, some embodiments of the present invention provide an optical analysis method, and its steps include a light source irradiation and detection light generating step and a detection light reception and analysis step. In the light source irradiation and detection light generating step: providing a light source device including a first light-emitting unit and a second light-emitting unit, and using a control processing unit to control the light source device to emit a first irradiating light to a fourth irradiating light at a first time to a fourth time to respectively irradiate an object to be tested to respectively generate a first detection light to a fourth detection light, wherein the first light-emitting unit is driven by a first driving electric current and by a second driving electric current to respectively emit the first irradiating light and the second irradiating light, the second light-emitting unit is driven by a third driving electric current and a fourth driving electric current to respectively emit the third irradiating light and the fourth irradiating light, a first peak wavelength to a fourth peak wavelength of the first irradiating light to the fourth irradiating light are different from one another, and a first wavelength range to a fourth wavelength range of the first irradiating light to the fourth irradiating light are different from one another, wherein the first time is not equal to the second time, and the third time is not equal to the fourth time. In the detection light reception and analysis step: using a first optical receiver to respectively receive the first detection light to the fourth detection light at the first time to the fourth time and to generate a first detection signal to a fourth detection signal, and using the control processing unit to generate analysis results of the object to be tested according to the first detection signal to the fourth detection signal.

Further, in some embodiments of the present invention, the first light-emitting unit emits light at a first on-off frequency, and the second light-emitting unit emits light at a second on-off frequency, wherein the first on-off frequency and the second on-off frequency are the same or different from each other, the first on-off frequency and the second on-off frequency are between 0.05 time/second and 50,000 times/second, and a time interval of the first on-off frequency and the second on-off frequency for turning on the first light-emitting unit and second light-emitting unit is between 0.00001 second and 10 seconds.

Further, in some embodiments of the present invention, the optical analysis method further includes a reference signal obtaining step. In the reference signal obtaining step: using a second optical receiver disposed on a side of a shielding plate disposed between the light source device and the object to be tested and the side facing the light source device to receive a part of every one of the first irradiating light to the fourth irradiating light and thereby generating a first reference signal to a fourth reference signal. In the light source irradiation and detection light generating step, another part of every one of the first irradiating light to the fourth irradiating light passes through a light transmission hole of the shielding plate to irradiate the object to be tested, and in the detection light reception and analysis step, the control processing unit generates the analysis results of the object to be tested according to the first reference signal to the fourth reference signal and to the first detection signal to the fourth detection signal.

Further, in some embodiments of the present invention, a full width at half maximum (FWHM) which at least one of the first peak wavelength to the fourth peak wavelength corresponds to is greater than 0 nm and less than or equal to 60 nm.

Further, in some embodiments of the present invention, in the detection light reception and analysis step, the control processing unit which respectively divide the first detection signal to fourth detection signal by the first reference signal to the fourth reference signal calculates a first ratio to a fourth ratio, and generates the analysis results of the object to be tested according to the first ratio to the fourth ratio.

Further, in some embodiments of the present invention, in the detection light reception and analysis step, the control processing unit is configured to a first gain to a fourth gain for use in amplifying the first detection signal to the fourth detection signal according to the first reference signal to the fourth reference signal, and a variable gain amplification device amplifies the first detection signal to the fourth detection signal according to the first gain to the fourth gain, and the control processing unit generates the analysis results of the object to be tested according to the amplified first detection signal to the amplified fourth detection signal.

Further, in some embodiments of the present invention, the variable gain amplification device further includes a programmable resistor, and in the detection light reception and analysis step the programmable resistor changes the gain of the variable gain amplifier device via using the control processing unit.

Further, in some embodiments of the present invention, in the detection light reception and analysis step, using a Fourier transform device to convert a time domain measurement signal of the object to be tested to a frequency domain measurement signal of the object to be tested, and the control processing unit obtains a spectral signal of the object to be tested to serve as the analysis results of the object to be tested after the control processing unit filters out noise from the frequency domain measurement signal of the object to be tested, wherein the first detection signal to the fourth detection signal form the time domain measurement signal of the object to be tested.

Given the above, the optical analysis system and optical analysis method provided by the embodiments of the present invention use varying driving electric currents to fine-tune the wavelength ranges and peak wavelengths of the irradiating lights generated by each light-emitting unit, and a plurality of irradiating lights of different wavelength ranges and peak wavelengths irradiate the object to be tested at different times, thereby improving the detection resolution and the detection accuracy of the spectrum of the object to be tested.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanied drawings are provided to enable those of ordinary skill in the art to which the present invention pertains to further understand the present invention, and are incorporated into and constitute a part of the specification of the present invention. The accompanied drawings illustrate exemplary embodiments of the invention and, together with the description of the invention, serve to explain the principles of the invention. The following is a brief description of each FIG. of the present invention.

DETAILED DESCRIPTION

Figure 1:
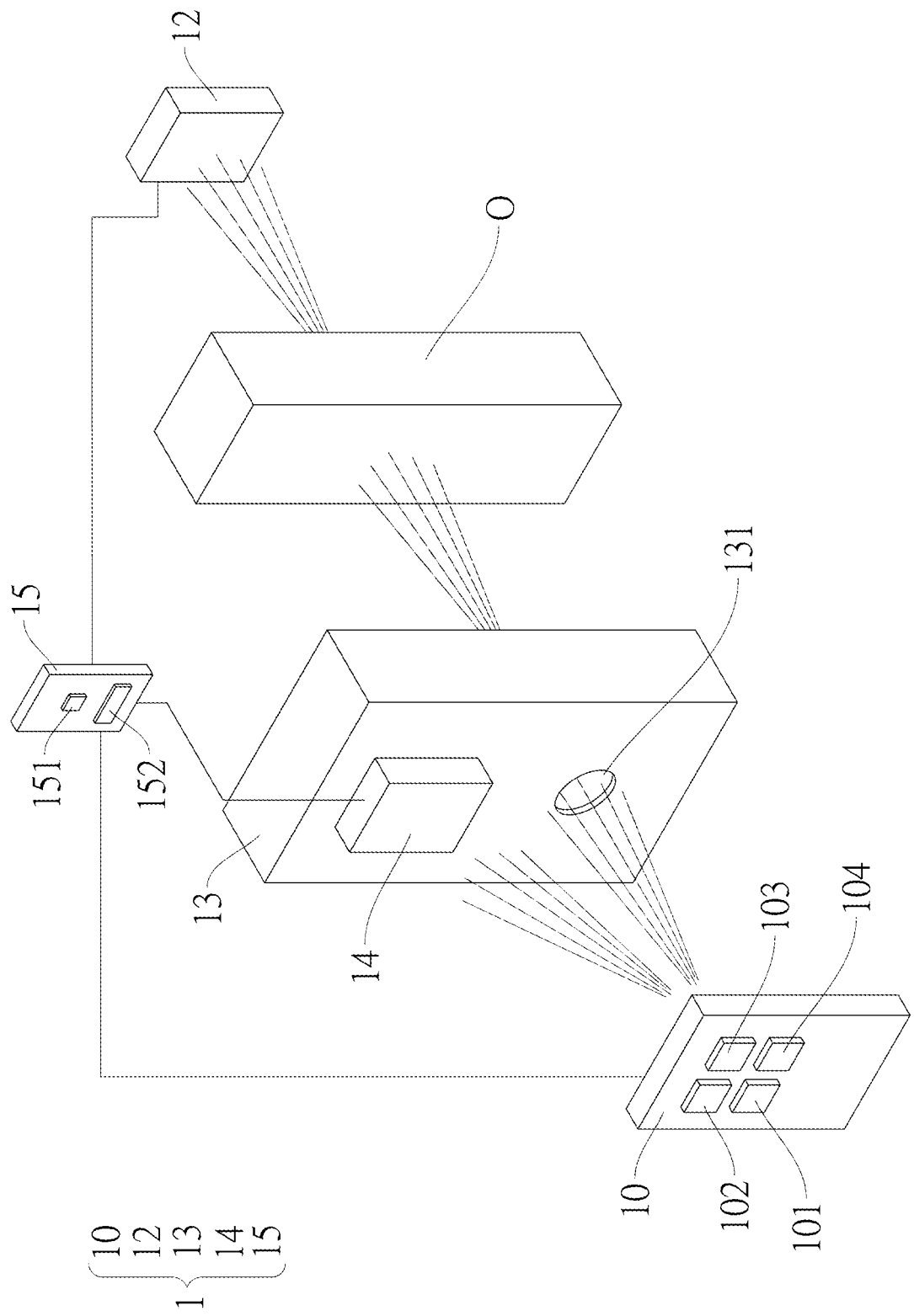
FIG. 1 is a schematic configurational diagram of an optical analysis system according to an embodiment of the present invention.

Please refer to FIG. 1. FIG. 1 is a schematic configurational diagram of an optical analysis system 1 according to an embodiment of the present invention. The optical analysis system 1 at least includes a light source device 10, an optical receiver 12 and a control processing unit 15, wherein the control processing unit 15 is electrically connected to the light source device 10 and to the optical receiver 12. The light source device 10 includes a plurality of light-emitting units 101 to 104, such as four light-emitting units, but the invention is not limited thereto. The control processing unit 15 may be used to control the turn-on time of the light-emitting units 101 to 104 and determine and provide the driving electric currents of the light-emitting units 101 to 104. Furthermore, the control processing unit 15 may receive the detection signals which are generated by the optical receiver 12 when receiving the detection lights, and thereby generating analysis results of the object to be tested.

Figure 2A:
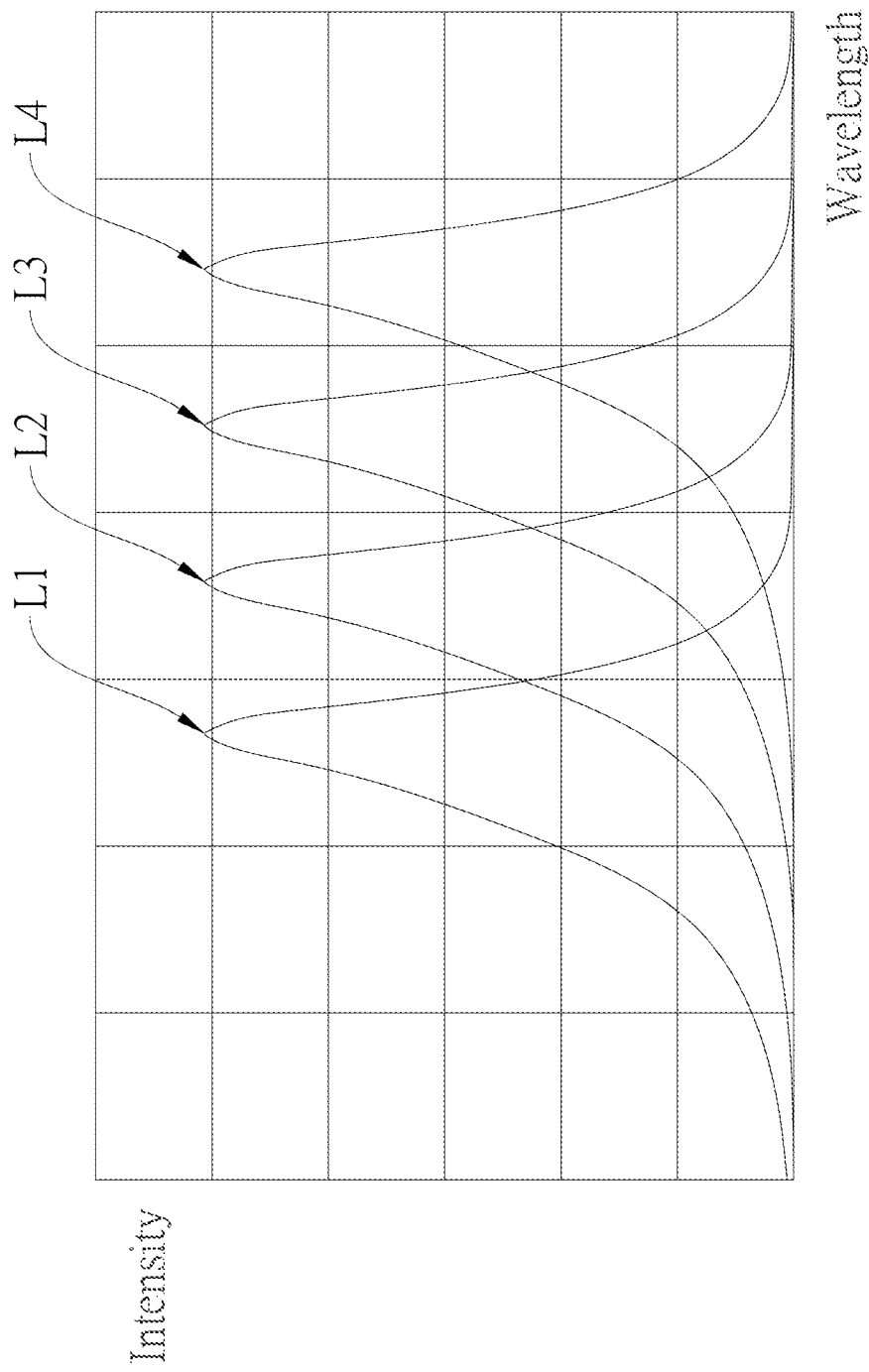
FIG. 2A is a schematic spectral diagram of the irradiating lights generated by each light-emitting unit which are driven by fixed driving electric currents according to an embodiment of the present invention.

Please refer to FIG. 1 and FIG. 2A at the same time. FIG. 2A is a schematic spectral diagram of the irradiating lights L1 to L4 generated by each light-emitting unit 101 to 104 which are driven by fixed driving electric currents according to an embodiment of the present invention. When the light-emitting units 101 to 104 are driven by fixed driving electric currents, the wavelength ranges and the peak wavelengths PW1 to PW4 of the irradiating lights L1 to L4 respectively generated by the light emitting units 101 to 104 are also fixed. In general spectral analysis, if infrared is selected, the wavelength range may be between 650 nm and 720 nm (including the two endpoints of 650 nm and 720 nm). The light emitting units 101 to 104 are designed so that the wavelength ranges of the irradiating lights L1 to L4 generated by the light emitting units 101 to 104 are different from one another, and the light emitting units 101 to 104 are designed so that the peak wavelengths PW1 to PW4 of the irradiating lights L1 to L4 generated by the light emitting units 101 to 104 are different from one another.

Figure 2B:
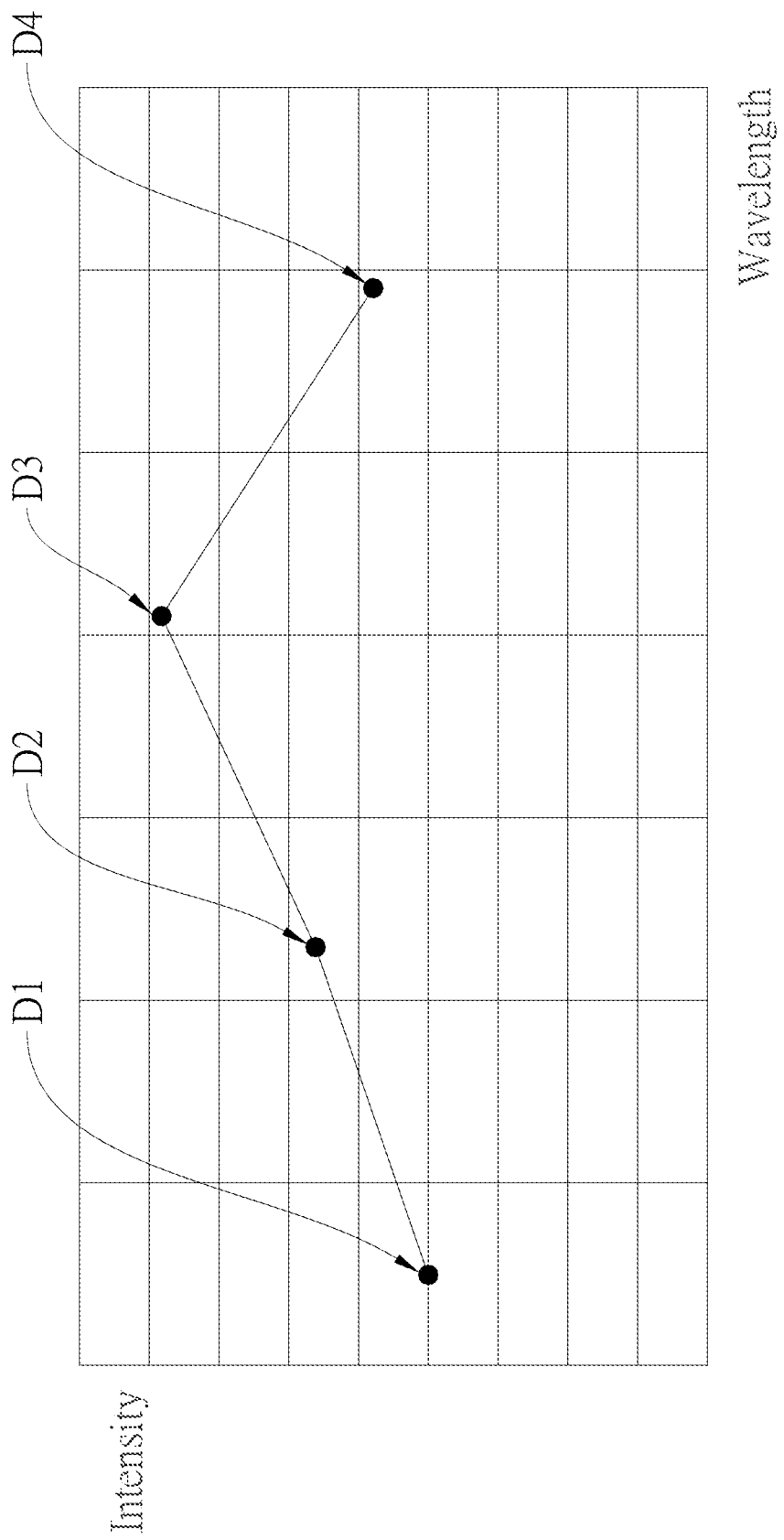
FIG. 2B is a schematic spectral diagram of the detection lights generated by the irradiating lights of FIG. 2A to irradiate the object to be tested and received by the optical analysis system according to the embodiment of the present invention.

Please refer to FIG. 1 and FIG. 2B. FIG. 2B is a schematic spectral diagram of the detection lights D1 to D4 generated by the irradiating lights L1 to L4 of FIG. 2A to irradiate the object O to be tested and received by the optical analysis system 1 according to the embodiment of the present invention. When each light-emitting units 101 to 104 only uses fixed electric currents, four transmitted lights which transmit the object O to be tested are generated in different times, or four transmitted lights which are reflected by the object O to be tested are generated in different times if the irradiating lights L1 to L4 are generated in different times (that is, the light-emitting units 101 to 104 are turned on in different times) and irradiates the object O to be tested. The four transmitted lights or four transmitted lights serve as four detection lights D1 to D4 and are received by the optical receiver 12, thereby generating four detection signals. The control processing unit 15 generates the analysis results of the object O to be tested according to the four detection signals.

Since the driving electric currents are fixed, in this example, the spectra corresponding to the analysis results are shown in FIG. 2B, which are composed of a line passing through four points corresponding to the detection lights D1-D4. Therefore, both the detection resolution and the detection accuracy of the spectra of the object O to be tested are insufficient if the number of light-emitting units 101 to 104 is not increased when the driving electric currents are fixed. In order to improve this technical problem, the present invention mainly controls the processing unit 15 to turn on different light-emitting units 101 to 104 with different driving electric currents in different times to greatly improve the detection resolution and the detection accuracy of the spectra of the object O to be tested by using fewer or limited light-emitting units 101 to 104.

Figure 3A:
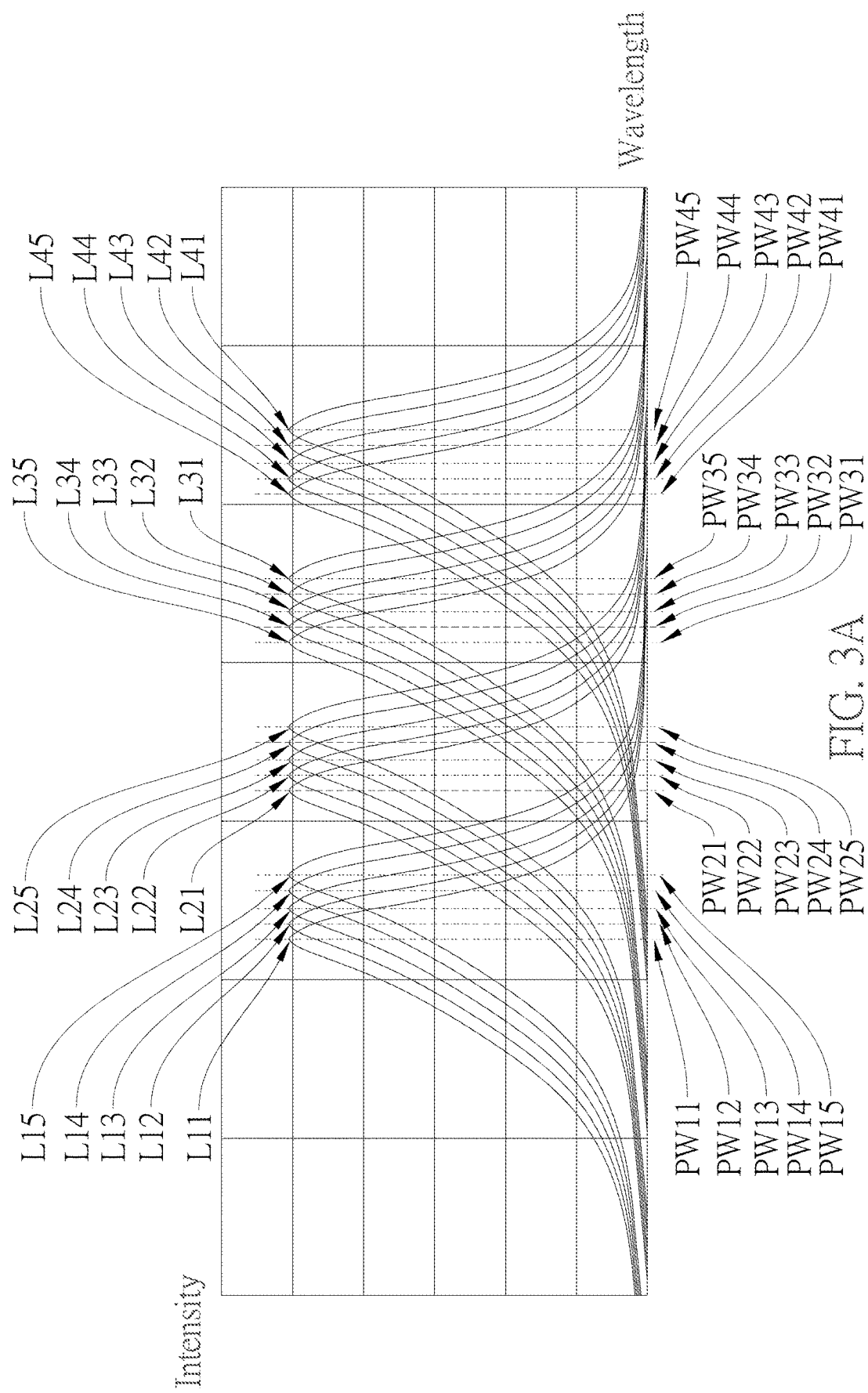
FIG. 3A is a schematic diagram of the ideal spectra of the irradiating lights of each light-emitting units generated by different driving electric currents according to one embodiment of the present invention.

Please refer to FIG. 1 and FIG. 3A. FIG. 3A is a schematic diagram of the ideal spectra of the irradiating lights L11 to L45 of each light-emitting units 101 to 104 generated by different driving electric currents according to the embodiment of the present invention. In FIG. 3A, the light-emitting unit 101 is driven by five different driving electric currents in different times thereby generating five irradiating lights L11 to L15, wherein the irradiating lights L11 to L15 have different wavelength ranges and different peak wavelengths PW11 to PW15, in other words, the wavelength ranges and the peak wavelengths PW11 to PW15 of the irradiating lights L11 to L15 may be fine-tuned by changing the driving electric currents via the control processing unit 15.

Similarly, the irradiating lights L21 to L25 have different wavelength ranges and different peak wavelengths PW21 to PW25, the irradiating lights L31 to L35 have different wavelengths and different peak wavelengths PW31 to PW35 and the irradiating lights L31 to L35 have different wavelengths and different peak wavelengths PW31 to PW35 when the light-emitting units 102 to 104 are driven by different driving electric currents in different times. In other words, the wavelength ranges and the peak wavelengths PW21 to PW25 of the irradiating lights L21 to L25, the wavelength ranges and the peak wavelengths PW31 to PW35 of the irradiating lights L31 to L35 and the wavelength ranges and the peak wavelengths PW41 to PW45 of the irradiating lights L31 to L45 may be fine-tuned by changing the driving electric currents via the control processing unit 15.

In one embodiment, the irradiating lights L11 to L45 irradiate the object O to be tested in different times, that is, only one of the irradiating lights L11 to L45 irradiates the object O to be tested within a period of time. In another embodiment, one of the irradiating lights L11 to L15, one of the irradiating lights L21 to L25, one of the irradiating lights L31 to L35 and one of the irradiating lights L41 to L45 may simultaneously irradiate the object O to be tested within a period of time, but the irradiating lights L11 to L15 irradiate the object O to be tested in different times, the irradiating lights L21 to L25 irradiate the object O to be tested in different times, the irradiating lights L31 to L35 irradiate the object O to be tested in different times, and the irradiating lights L41 to L45 irradiate the object O to be tested in different times. For example, the time in which the irradiating lights L11 to L15 irradiate the object O to be tested is different, the time in which the irradiating lights L21 to L25 irradiate the object O to be tested is different, the time in which the irradiating lights L31 to L35 irradiate the object O to be tested is different, and the time in which the irradiating lights L41 to L45 irradiate the object O to be tested is different, but the irradiating lights L11, L21, L31 and L41 irradiate the object O to be tested at the same time, the irradiating lights L12, L22, L32 and L42 irradiate the object O to be tested at the same time, the irradiating lights L13, L23, L33 and L43 irradiate the object O to be tested at the same time, the irradiating lights L14, L24, L34 and L44 irradiate the object O to be tested at the same time, and the irradiating lights L15, L25, L35 and L45 irradiate the object O to be tested at the same time.

Figure 3B:
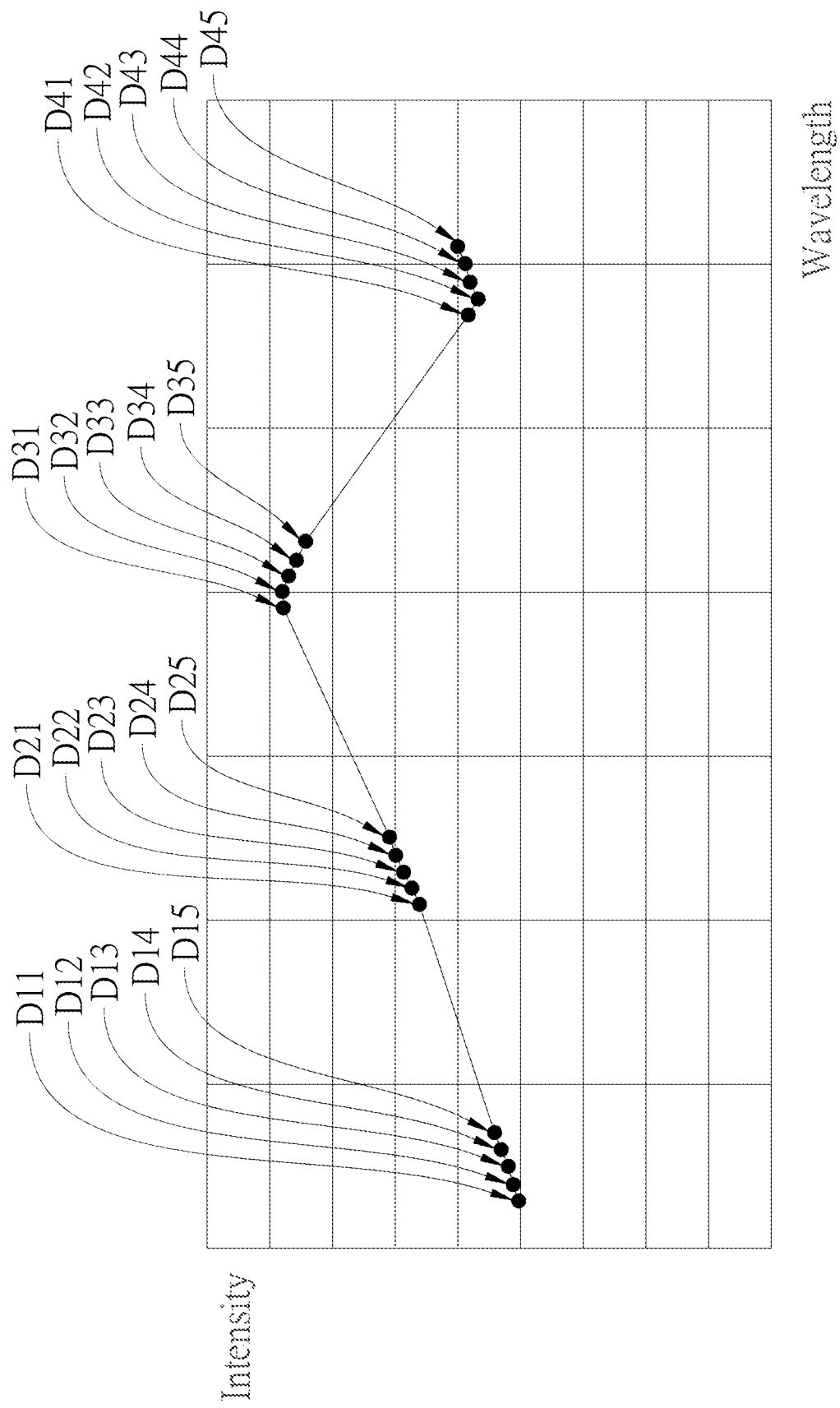
FIG. 3B is a schematic diagram of the spectra of the detection lights generated by the irradiating lights of FIG. 3A to irradiate the object to be tested and received by the optical analysis system according to the embodiment of the present invention.

Next, please refer to FIG. 1, FIG. 3A and FIG. 3B at the same time. FIG. 3B is a schematic diagram of the spectra of the detection lights D11 to D45 generated by the irradiating lights L11 to L45 of FIG. 3A to irradiate the object O to be tested and received by the optical analysis system 1 according to the embodiment of the present invention. According to the above, the control processing unit 15 controls the optical receiver 12 to receive one of the detection lights D11 to D45 within a period of time, or to receive one of the detection lights D11 to D15 or one of the detection lights D21 to D25, one of the detection lights D31 to D35 and one of the detection lights D41 to D45 within a period of time. In this example, the optical receiver 12 generates 20 detection signals in total, and the control processing unit 15 generates the analysis results of the object O to be tested according to these 20 detection signals.

Since the driving electric currents are variable, in this example, the spectra corresponding to the analysis results are shown in FIG. 3B, which are composed of a line connecting 20 points corresponding to the detection lights D11 to D45. Therefore, by the method of providing driving electric currents in different times the detection resolution and the detection accuracy of the spectra of the object O to be tested may be effectively improved without increasing the number of light-emitting units 101 to 104.

In an embodiment of the present invention, every one of the light-emitting units 101 to 104 emits light or is turned off at an on-off frequency. The on-off frequencies of every one of the light-emitting units 101 to 104 may be the same or different from one another. In other embodiments, the light-emitting units 101 to 104 may not need to emit light or be turned off at the on-off frequency. In the present invention, in order to avoid causing the deterioration of the object O to be tested and to have a sufficient number of detection samples to ensure the detection accuracy, the on-off frequency is designed to be between 0.05 time/second and 50,000 times/second (including the two endpoints of 0.05 time/second and 50,000 times/second), and the time interval for turning on the light-emitting units 101 to 104 in the on-off frequency is between 0.00001 second and 10 seconds (including the two endpoints of 0.00001 second and 10 seconds). Furthermore, the time interval for turning off the light-emitting units 101 to 104 in the on-off frequency may be designed to be between 0.00001 second and 10 seconds (including the two endpoints of 0.00001 second and 10 seconds), but the main factor to affect the detection accuracy is the time interval for turning on the light-emitting units 101 to 104 in the on-off frequency.

In this embodiment, every one of the light-emitting units 101 to 104 is a light-emitting diode, a vertical-cavity surface-emitting laser (VCSEL) or a laser diode. Generally speaking, based on the luminous efficiency, the number of quantum well pairs of the light-emitting units 101 to 104 is increased. However, this would lead to an increase in a full width at half maximum (FWHM) of the peak wavelengths PW1 to PW4 of every one of the irradiating lights L1 to L4 (taking a fixed driving electric current as an example) of the light-emitting units 101 to 104 to result in the double peaks of the irradiating lights L1 to L4, which would seriously affect and decrease the detection accuracy.

In order to solve this technical problem, there is a need to decrease the number of quantum well pairs of the light-emitting units 101 to 104 to control the full width at half maximum (FWHM) of the peak wavelengths PW1 to PW4 of the irradiating lights L1 to L4 (taking a fixed driving electric current as an example) to be greater than 0 nm and less than or equal to 60 nm. In this way, the full width at half maximum (FWHM) of the peak wavelengths PW11 to PW45 of the irradiating lights L11 to L45 (in the case of variable driving electric currents) is greater than 0 nm and less than or equal to 60 nm to show no double peak, so it may effectively improve the detection accuracy.

Incidentally, in one embodiment, the full width at half maximum (FWHM) of the peak wavelengths PW11 to PW45 of the irradiating lights L11 to L45 may be greater than or equal to 15 nm and less than or equal to 50 nm. In another embodiment, the full width at half maximum (FWHM) of the peak wavelengths PW11 to PW45 of the irradiating lights L11 to L45 is greater than or equal to 15 nm and less than or equal to 40 nm.

In addition, in one embodiment, the peak wavelength difference value between two adjacent peak wavelengths PW11 to PW45 of the irradiating lights L11 to L45 is greater than or equal to 1 nm and less than or equal to 80 nm, so as to obtain better detection resolution. More preferably, the peak wavelength difference value between two adjacent peak wavelengths PW11 to PW45 of the irradiating lights L11 to L45 is greater than or equal to 5 nm and less than or equal to 80 nm. Furthermore, in one embodiment of the present invention, the peak wavelength difference value between two adjacent peak wavelengths PW11 to PW45 of the irradiating lights L11 to L45 is greater than or equal to 0.5 nm.

Figure 4A:
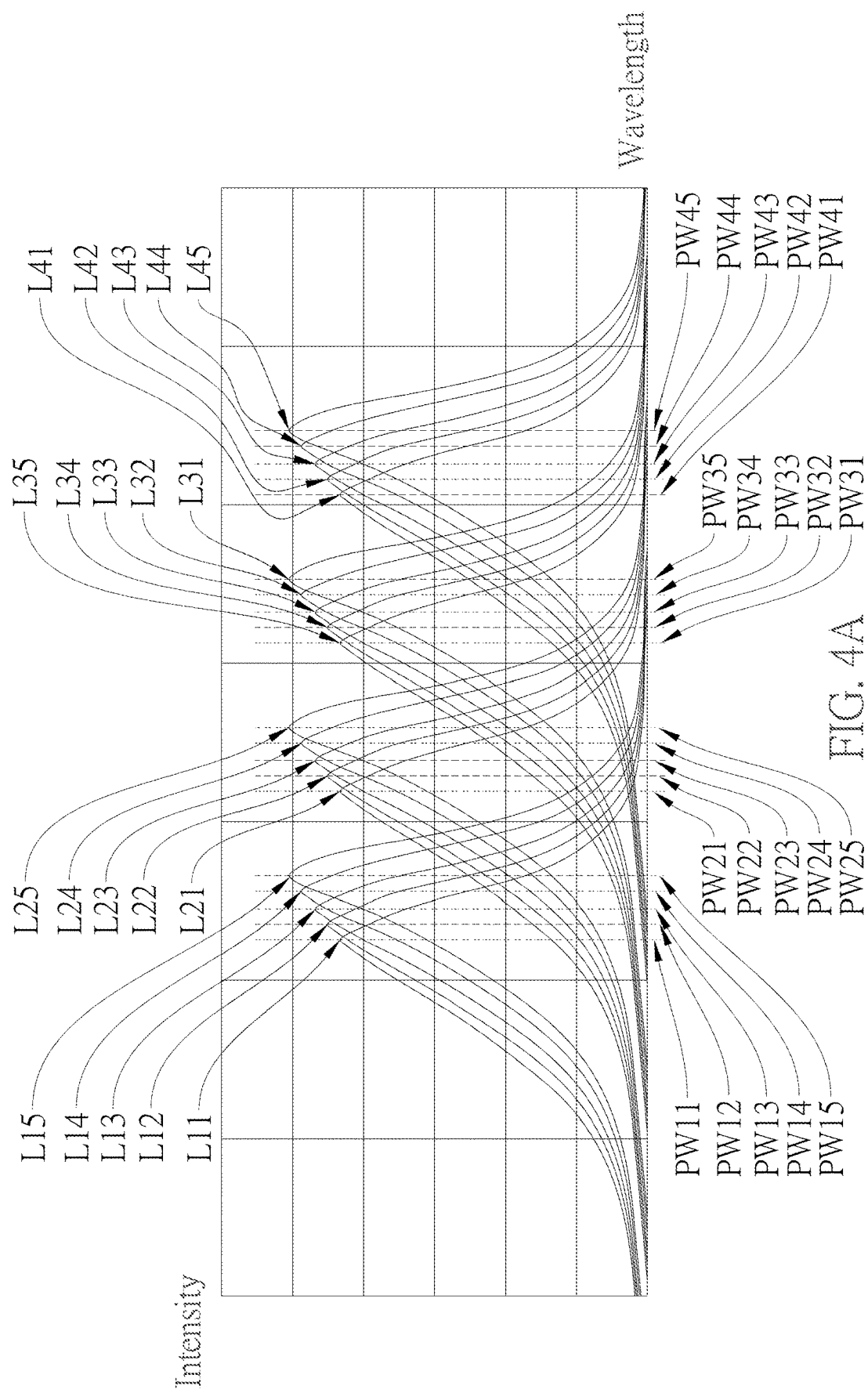
FIG. 4A is a schematic diagram of an actual spectra of the irradiating lights generated by each light-emitting unit driven by different driving electric currents according to an embodiment of the present invention.
Figure 4B:
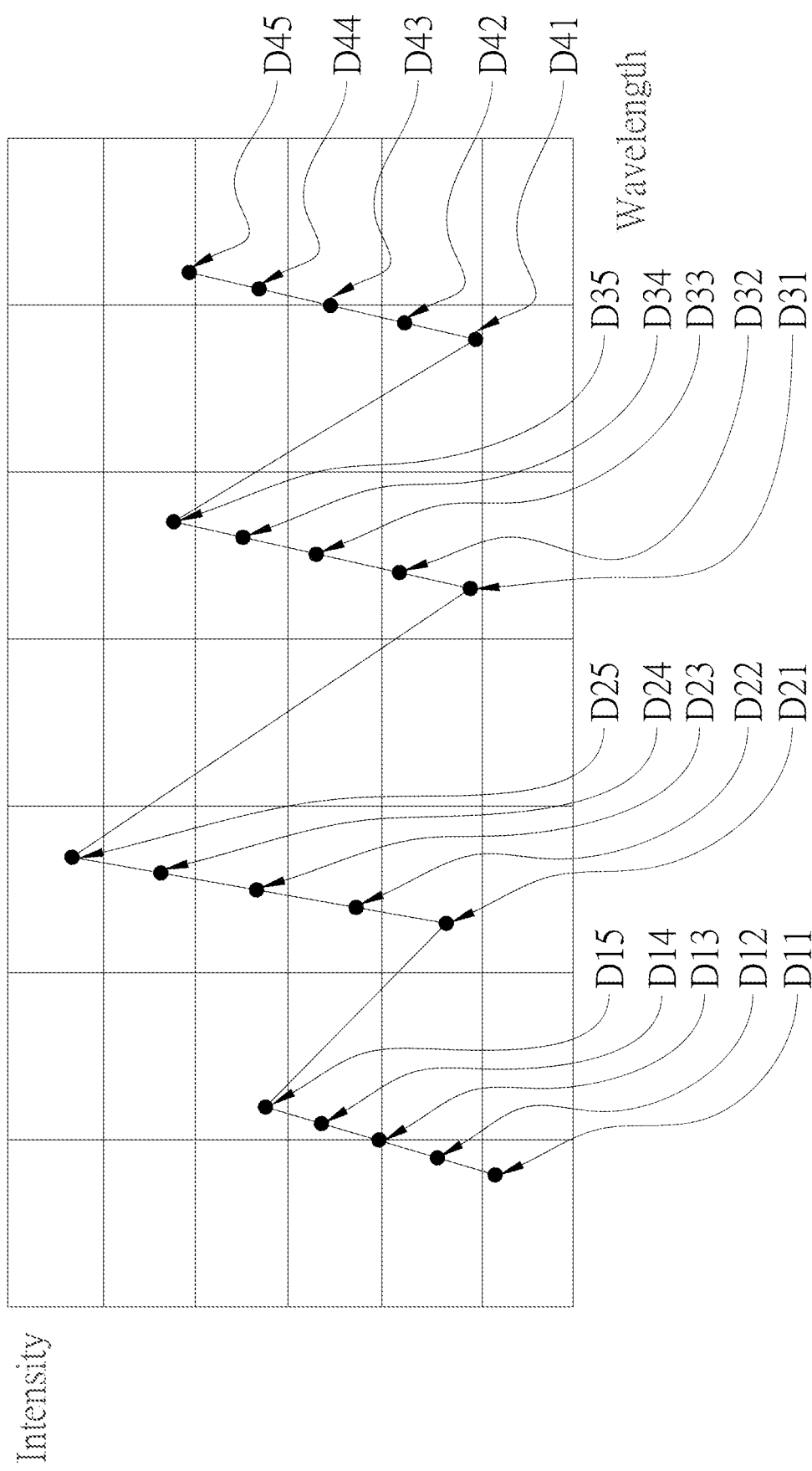
FIG. 4B is a schematic diagram of the spectra of the detection lights generated by the irradiating lights in FIG. 4A to irradiate the object to be tested and received by the optical analysis system of the embodiment of the present invention.

Please refer to FIG. 1, FIG. 4A and FIG. 4B. FIG. 4A is a schematic diagram of an actual spectra of the irradiating lights generated by each light-emitting unit driven by different driving electric currents according to an embodiment of the present invention, and FIG. 4B is a schematic diagram of the spectra of the detection lights generated by the irradiating lights in FIG. 4A to irradiate the object to be tested and received by the optical analysis system of the embodiment of the present invention. As shown in FIG. 4A, the corresponding irradiating lights are L11 to L15 when the light-emitting unit 101 is driven by an electric current of 100 mA, 200 mA, 300 mA, 400 mA and 500 mA respectively, and the light intensities are different. Accordingly, the light intensities of the detection lights D11 to D14 in FIG. 4B are different from the ideal light intensities of the detection lights D11 to D14 in FIG. 3B. Similarly, the light intensities of the detection lights D41 to D44 in FIG. 4B are different from the ideal light intensities of the detection lights D41 to D44 in FIG. 3B.

It shows that changing the driving electric currents of the light-emitting units 101 to 104 may also lead to a change in the light intensities of the irradiating lights L11 to L45. As shown in FIG. 4A and FIG. 4B, further monitoring actions may be taken and an optical analysis is performed to ensure the detection accuracy by a method of obtaining a ratio since the light intensity attenuation rate of the detection lights D11 to D14 is consistent with the light intensity attenuation rate of the irradiating lights L11 to L14.

In FIG. 1, the optical analysis system 1 further includes a shielding plate 13 and an optical receiver 14. The optical receiver 14 is electrically connected to the control processing unit 15. The shielding plate 13 is disposed between the light source device 10 and the object O to be tested, and has a light-transmitting hole 131 to allow a part of every one of the irradiating lights L11 to L45 to pass through and to irradiate the object O to be tested. The optical receiver 14 is disposed on a side of the shielding plate 13, the side faces the light source device 10 and is used to receive another part of every one of the irradiating lights L11 to L45, and thereby generating 20 reference signals, wherein the control processing unit 15 generates the analysis results of the object O to be tested according to these 20 reference signals and 20 detection signals.

Please note that the above-mentioned shielding plate 13 with the light-transmitting hole 131 is actually a uniformly mixing/splitting element, which mainly allows every one of the irradiating lights L11 to L45 which are emitted in different times to go uniformly mixing/splitting. In other embodiments, the uniformly mixing/splitting element is an optical integrating sphere. The optical integrating sphere includes a light entrance, a first light exit and a second light exit. The first optical receiver 12 is aligned with the first light exit, and the second optical receiver 14 is aligned with the second light exit. Every one of the irradiating lights L11 to L45 enters the optical integrating sphere by the light entrance 21, a part of every one of the irradiating lights L11 to L45 exits by the first light exit, and another part of every one of the irradiating lights L11 to L45 exits by the second light exit. In other embodiments, the uniformly mixing/splitting element is a spectroscope set formed by and including one or more spectroscopes. The spectroscope set receives the irradiating lights L11 to L45, and the spectroscope set emits a part of the irradiating lights L11 to L45 for the first optical system to receive and emits another part of the irradiating lights L11 to L45 for the second optical receiver 14 to receive.

Further, the control processing unit 15 calculates a plurality of ratios obtained by dividing a plurality of detection signals by a plurality of reference signals, and generates the analysis results of the object O to be tested according to the plurality of ratios. For example, a detection signal corresponding to the irradiating light L11 is divided by a reference signal corresponding to the irradiating light L11 to obtain a ratio corresponding to the irradiating light L11. Then, the control processing unit 15 carries out the analysis results of the object to be tested according to a total of 20 ratios corresponding to the irradiating lights L11 to L45.

The above method is to solve the technical problem of the driving electric currents resulting in changing the light intensities by a monitoring manner, but the present invention is not limited thereto. In FIG. 1, the control processing unit 15 may further include a variable gain amplification device 151. The control processing unit 15 is configured to five gains for amplifying the five detection signals of the detection lights D11 to D15 according to the reference signals of the irradiating light L11 to L15, and the variable gain amplification device 151 is used to amplify the detection signals according to the above five gains. Similarly, the detection signals of the detection lights D21 to D45 are also be amplified. Then, the control processing unit 15 generates the analysis results of the object O to be tested according to the amplified detection signals of the detection lights D11 to D45.

Figure 4C:
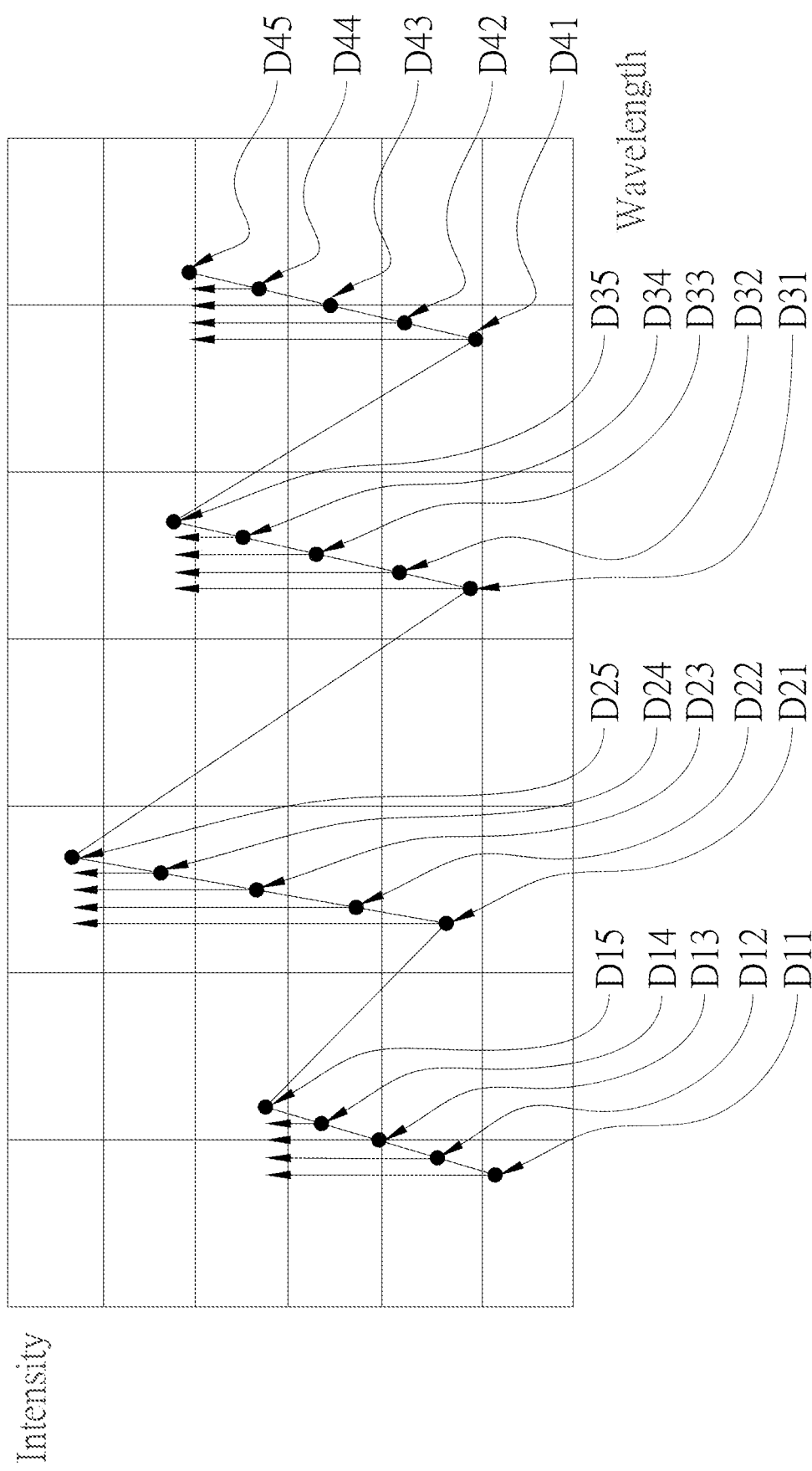
FIG. 4C is a schematic diagram of the spectra of the detection lights generated by the irradiating lights of FIG. 4A to irradiate the object to be tested and received by an optical analysis system according to the embodiment of the present invention after the detection signals of the detection lights undergo different gain amplification.

Please refer to FIG. 1, FIG. 4A and FIG. 4C. FIG. 4C is a schematic diagram of the spectra of the detection lights generated by the irradiating lights of FIG. 4A to irradiate the object to be tested and received by an optical analysis system according to the embodiment of the present invention after the detection signals of the detection lights undergo different gain amplification. For the detection lights D11 to D14, the light intensity of the detection signal of the detection light D15 may be used as the reference. Then, the detection signals of the detection lights D11 to D14 need to be amplified to make their light intensities equivalently raised up to the same as the intensities of the detection light D15. Similarly, the gain amplification of the detection signals of the detection lights D21 to D24, D31 to D34, D11 to D34 may be done, so the details are not elaborated again. On the other hand, the variable gain amplifier device 151 further includes a programmable resistor (not shown). The programmable resistor changes the gain of the variable gain amplifier device 115 via using the control processing unit 115.

Moreover, in order to further improve the detection accuracy, the control processing unit 15 further includes a Fourier transform device 152. The detection signals of the detected lights D11 to D45 form a time domain measurement signal of the object O to be tested. The Fourier transform device 152 converts the time domain measurement signal of the object O to be tested into a frequency domain measurement signal of the object O to be tested, and the control processing unit 15 obtains the spectral signals of the object O to be tested as the analysis results of the object O to be tested after the control processing unit 15 filters out noise from the frequency domain measurement signal of the object O to be tested. Further, the control processing unit 15 may obtain the detection signals to serve as the noise signal when the light-emitting units 101 to 104 are not turned on, and the frequency domain noise signals may be generated after the Fourier transform device 152 converts the noise signal. The control processing unit 15 subtracts the frequency domain noise signals from the frequency domain measurement signals of the object O to be tested to obtain the frequency domain measurement signals of the object O to be tested with the noise filtered out.

Figure 5:
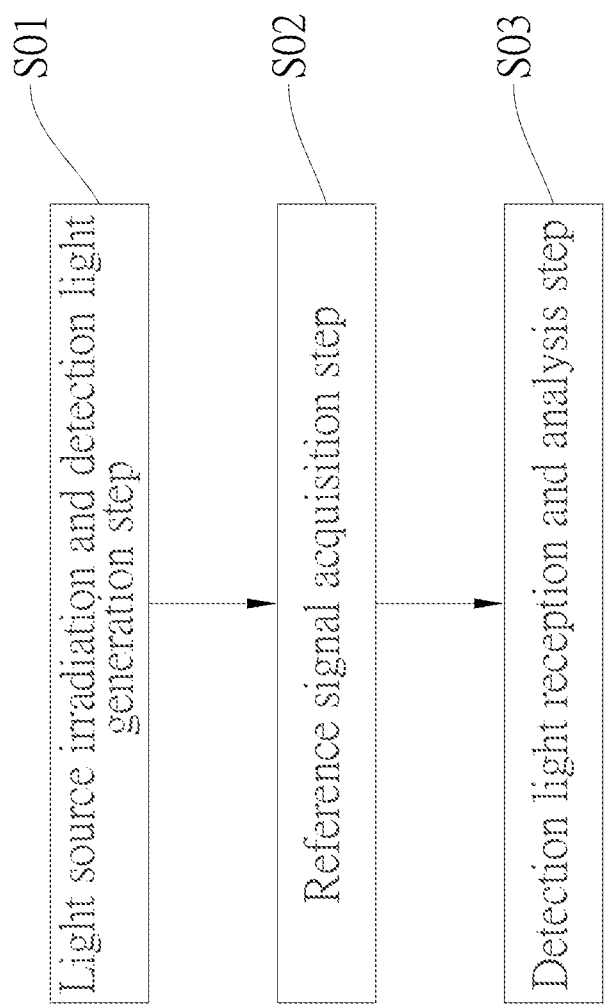
FIG. 5 is a flow chart of an optical analysis method according to an embodiment of the present invention.

Please refer to FIG. 1, FIG. 4A, FIG. 4B and FIG. 5 at the same time. FIG. 5 is a flow chart of an optical analysis method according to an embodiment of the present invention. The optical analysis method in FIG. 5 includes a light source irradiation and detection light generating step (S01) and a detection light reception and analysis step (S03). In the light source irradiation and detection light generating step (S01): providing a light source device 10 including a plurality of light-emitting units 101 to 104, and using a control processing unit 15 to control the light source device 10 to respectively emit the irradiating lights L11 to L45 in different times to irradiate the object O to be tested to respectively generate the detection lights D11 to D45, wherein the light-emitting units 101 to 104 respectively emit the irradiating lights L11 to L45 driven by different driving electric currents. The peak wavelengths PW11 to PW45 of the irradiating lights L11 to L45 are different from one another, and the wavelength ranges of the irradiating lights L11 to L45 are different from one another. In the detection light reception and analysis step (S03): using the optical receiver 12 to receive the detection lights D11 to D45 in different times to generate a plurality of detection signals of the detection lights D11 to D45, and using the control processing unit 15 to generate the analysis results of the object O to be tested according to the detection signals of the detection lights D11 to D45.

Further, in some embodiments of the present invention, the plurality of light-emitting units 101 to 104 emit light at an on-off frequency. The on-off frequency of the plurality of light-emitting units 101 to 104 may be the same or different from one another. The on-off frequency may be between 0.05 time/second to 50,000 times/second, and the time interval for turning on the light-emitting units 101 to 104 in the on-off frequency is between 0.00001 seconds and 10 seconds.

Further, the above-mentioned optical analysis method further includes a reference signal obtaining step (S02). In the reference signal obtaining step (S02): using the optical receiver 14 disposed on a side of the shielding plate 13 disposed between the light source device 10 and the object O to be tested and the side facing the light source device 10 to receive a part of every one of the irradiating lights L11 to L45, and thereby generating a plurality of reference signals of the irradiating lights L11 to L45. In the light source irradiation and detection light generating step (S01), another part of every one of the irradiating lights L11 to L45 passes through the light-transmitting hole 131 of the shielding plate 13 to irradiate the object O to be tested, and in the detection light reception and analysis step (S03), the control processing unit 15 generates the analysis results of the object O to be tested according to the plurality of reference signals of the irradiating lights L11 to L45 and the detection signals of the detection lights D11 to D45 of the irradiating lights L11 to L45.

In addition, as mentioned above, in order to achieve better detection accuracy, the full width at half maximum (FWHM) which at least one of the peak wavelengths PW11 to PW45 corresponds to is greater than 0 nm and less than or equal to 60 nm. Furthermore, in the detection light reception and analysis step (S03), the control processing unit 15 which respectively divide the detection signals of the detection lights D11 to D45 by the reference signals of the irradiating lights L11 to L45 calculates a plurality of ratios, and generates the analysis results of the object O to be tested according to the plurality of ratios. In addition, further in the detection light reception and analysis step (S03), configuring the control processing unit 15 to a plurality of gains for use in amplifying the plurality of detection signals of the detection lights D11 to D45 according to the reference signals of the irradiating lights L11 to L45, and using the variable gain amplifier device 151 to amplify the plurality of detection signals of the detection lights D11 to D45 according to the above plurality of gains, and the control processing unit 15 generates the analysis results of the object O to be tested according to the amplified plurality of detection signals of the detection lights D11 to D45.

Figure 6:
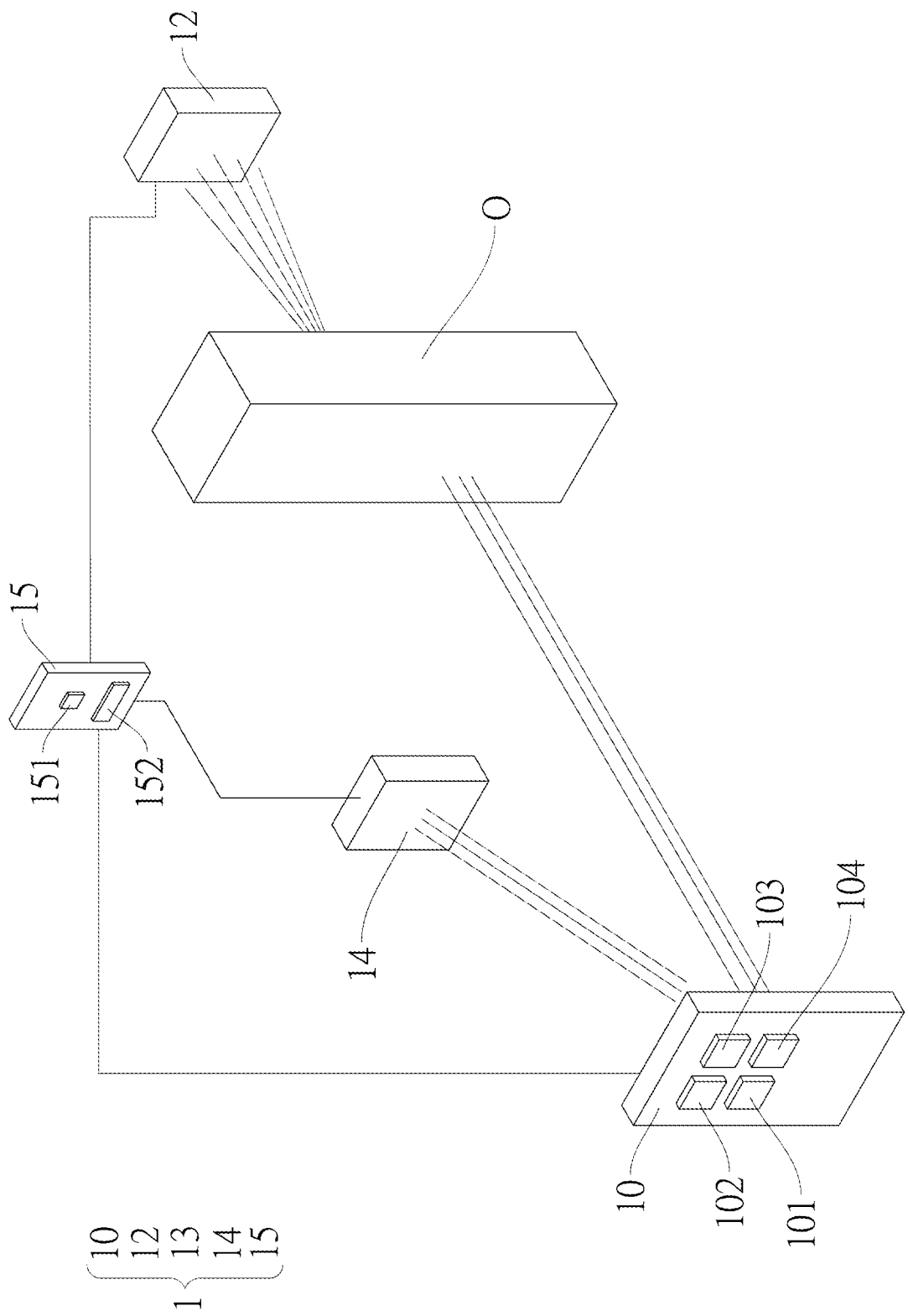
FIG. 6 is a schematic configurational diagram of an optical analysis system according to another embodiment of the present invention.

Optionally, in some embodiments of the present invention, the variable gain amplification device 151 further includes a programmable resistor. In the detection light reception and analysis step (S03), the programmable resistor changes the gain of the variable gain amplifier device via the control processing unit. Optionally, in the detection light reception and analysis step (S03), the Fourier transform device 152 is used to convert the time domain measurement signals of the object O to be tested into the frequency domain measurement signals of the object to be tested, and the control processing unit 15 obtains the spectral signals of the object O to be tested as the analysis results of the object O to be tested after the control processing unit 15 filter out noise from the frequency domain measurement signals of the object O to be tested. The plurality of detection signals of the detection lights D11 to D45 form the time domain measurement signals of the object O to be tested. Please refer to FIG. 6. FIG. 6 is a schematic configurational diagram of an optical analysis system according to another embodiment of the present invention. Unlike the embodiment of FIG. 1, the shielding plate 13 which serves as a uniformly mixing/splitting element is removed. Further, the optical receivers 12 and 14 are disposed on different two sides of the object O to be tested. The optical receiver 14 for the object O to be tested is used to receive a part of every one of the irradiating lights L11 to L45 and generate the detection lights D11 to D45. The optical receiver 12 respectively receives the detection lights D11 to D45 in different times to generate 20 detection signals. The optical receiver 14 is used to receive another part of every one of the irradiating lights L11 to L45, and thereby generating 20 reference signals. The control processing unit 15 generates the analysis results of the object O to be tested according to the 20 reference signals and the 20 detection signals.

To summarize the above embodiments, the optical analysis system 1 and the optical analysis method provided by the embodiments of the present invention may make the wavelength ranges and the peak wavelengths of the irradiating lights which are generated by each light-emitting unit fine-tuned, merely by simply changing the driving electric currents of the light-emitting units via using the control processing unit. Then a plurality of irradiating lights of different wavelength ranges and peak wavelengths irradiate the object to be tested in different times, so that merely fewer light-emitting units may be used to improve the detection resolution and the detection accuracy of the spectra of the object to be tested.

Further, in one embodiment, a shielding plate and another optical receiver are also designed to instantly compensate the brightness attenuation caused by changing the driving electric currents of the light-emitting units via monitoring the brightness of the lights emitted by the light-emitting units, so that no complicated and cumbersome brightness correction processes are needed. In addition, with respect to the attenuated brightness, the present invention also designs a variable gain amplification device to amplify the detection signals generated by different driving electric currents with different gains. In another embodiment, the present invention also designs a Fourier transform device. Noise is filtered out via the analysis on the frequency domain, so as to obtain the spectral signals of the object to be tested more accurately.

However, the above are only preferred embodiments of the present invention, and they are not used to limit the scope of the present invention. That is, simple equivalent changes and modifications made in accordance with the claims of the present invention and the descriptions of the present invention are still within the scope of the present invention. In addition, any embodiment or claim of the present invention does not necessarily achieve all the purposes, advantages or features disclosed in the present invention. In addition, the abstract and the title are only used to assist the search of patent documents and are not intended to limit the scope of the invention. In addition, terms such as "first" and "second" mentioned in this specification or the claims are only used to name elements or distinguish different embodiments or scopes, and are not used to limit the upper limit or the lower limit of the number of an element.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical analysis system, comprising:
   a light source device comprising a first light-emitting unit and a second light-emitting unit, wherein the first light-emitting unit is driven by a first driving electric current and by a second driving electric current to respectively emit a first irradiating light and a second irradiating light, the second light-emitting unit is driven by a third driving electric current and by a fourth driving electric current to respectively emit a third irradiating light and a fourth irradiating light, a first peak wavelength to fourth peak wavelength corresponding to the first irradiating light to the fourth irradiating light are different from each other, and a first wavelength range to a fourth wavelength range corresponding to the first irradiating light to fourth irradiating light are different from each other, wherein the light source device respectively emits the first irradiating light to the fourth irradiating light at first time to the fourth time to irradiate an object to be tested to respectively generate a first detection light to a fourth detection light;
   a first optical receiver receiving the first detection light to the fourth detection light at the first time to the fourth time to respectively generate the first detection signal to the fourth detection signal; and
   a control processing unit, electrically connected to the light source device and to the first optical receiver for controlling the light source device and generating analysis results of the object to be tested according to the first detection signal to the fourth detection signal;
   wherein the first time is not equal to the second time, and the third time is not equal to the fourth time.

2. The optical analysis system according to claim 1, wherein the first light-emitting unit illuminates at a first on-off frequency, and the second light-emitting unit illuminates at a second on-off frequency, wherein the first on-off frequency and the second on-off frequency are the same or different from each other.

3. The optical analysis system according to claim 2, wherein the first on-off frequency and the second on-off frequency are between 0.05 time/second and 50,000 times/second.

4. The optical analysis system according to claim 3, wherein the time interval of the first on-off frequency and of the second on-off frequency for turning on the first light-emitting unit and second light-emitting unit is between 0.00001 second and 10 seconds, and the time interval of the first on-off frequency and of the second on-off frequency for turning off the first light-emitting unit and second light-emitting unit is between 0.00001 second and 10 seconds.

5. The optical analysis system according to claim 1, wherein a peak wavelength difference value between adjacent two of the first peak wavelength to the fourth peak wavelength is greater than or equal to 1 nm and less than or equal to 80 nm.

6. The optical analysis system according to claim 5, wherein the peak wavelength difference value between adjacent two of the first peak wavelength to the fourth peak wavelength is greater than or equal to 5 nm and less than or equal to 80 nm.

7. The optical analysis system according to claim 1, wherein a peak wavelength difference value between adjacent two of the first peak wavelength to the fourth peak wavelength is greater than or equal to 0.5 nm.

8. The optical analysis system according to claim 1, wherein a full width at half maximum (FWHM) which at least one of the first peak wavelength to the fourth peak wavelength corresponds to is greater than 0 nm and less than or equal to 60 nm.

9. The optical analysis system according to claim 8, wherein the full width at half maximum (FWHM) which at least one of the first peak wavelength to the fourth peak wavelength corresponds to is greater than or equal to 15 nm and less than or equal to 50 nm.

10. The optical analysis system according to claim 9, wherein the full width at half maximum (FWHM) which at least one of the first peak wavelength to the fourth peak wavelength corresponds to is greater than or equal to 15 nm and less than or equal to 40 nm.

11. The optical analysis system according to claim 1, wherein each one of the first light-emitting unit and the second light-emitting unit is a light-emitting diode, a vertical-cavity surface-emitting laser (VCSEL) or a laser diode.

12. The optical analysis system according to claim 11, wherein the first detection light to the fourth detection light are a first reflected light to a fourth reflected light or a first transmitted light to a fourth transmitted light respectively generated by the first detection light to the fourth detection light to irradiate the object to be tested.

13. The optical analysis system according to claim 1, further comprising:
   a uniformly mixing/splitting element for receiving every one of the first irradiating light to the fourth irradiating light and generating a part of every one of the first irradiating light to the fourth irradiating light for the first optical receiver to receive and another part of every one of the first irradiating light to the fourth irradiating light; and
   a second optical receiver, electrically connected to the control processing unit, and for use in receiving the another part of every one of the first irradiating light to the fourth irradiating light, and thereby generating a first reference signal to a fourth reference signal, wherein the control processing unit generates the analysis results of the object to be tested according to the first reference signal to the fourth reference signal and to the first detection signal to the fourth detection signal.

14. The optical analysis system according to claim 13, wherein the uniformly mixing/splitting element is a shielding plate, and the shielding plate is disposed between the light source device and the object to be tested and has a light-transmitting hole to allow the part of every one of the first irradiating light to the fourth irradiating light to pass through to irradiate the object to be tested, wherein the second optical receiver is disposed at a side of the shielding plate and the side faces the light source device.

15. The optical analysis system according to claim 13, wherein the uniformly mixing/splitting element is an optical integrating sphere, and the optical integrating sphere comprises a light entrance, a first light exit and a second light exit; the first optical receiver is aligned with the first light exit and the second optical receiver is aligned with the second light exit, wherein every one of the first irradiating light to the fourth irradiating light enters the optical integrating sphere by the light entrance, the part of the first irradiating light to the fourth irradiating light exits by the first light exit, the another part of the first irradiating light to the fourth irradiating light exits by the second light exit; or, uniformly mixing/splitting element is a spectroscope set formed by and comprising one or more spectroscopes, and the spectroscope set receives the first irradiating light to the fourth irradiating light, and the spectroscope set emits the part of the first irradiating light to the fourth irradiating light for the first optical receiver to receive and emits the another part of the first irradiating light to the fourth irradiating light for the second optical receiver to receive.

16. The optical analysis system according to claim 13, wherein the control processing unit which respectively divide the first detection signal to fourth detection signal by the first reference signal to the fourth reference signal calculates a first ratio to a fourth ratio, and generates the analysis results of the object to be tested according to the first ratio to the fourth ratio.

17. The optical analysis system according to claim 13, wherein the control processing unit further comprises:
a variable gain amplification device, wherein the control processing unit is configured to a first gain to a fourth gain for use in amplifying the first detection signal to the fourth detection signal according to the first reference signal to the fourth reference signal, and the variable gain amplification device is used to amplify the first detection signal to the fourth detection signal according to the first gain to the fourth gain, and the control processing unit generates the analysis results of the object to be tested according to amplified the first detection signal to the fourth detection signal.

18. The optical analysis system according to claim 17, wherein the control processing unit further comprises:
a Fourier transform device, wherein the first detection signal to the fourth detection signal form a time domain measurement signal of the object to be tested, and the Fourier transform device converts the time domain measurement signal of the object to be tested to a frequency domain measurement signal of the object to be tested, and the control processing unit obtains a spectral signal of the object to be tested to serve as the analysis results of the object to be tested after the control processing unit filters out noise from the frequency domain measurement signal of the object to be tested.

19. The optical analysis system according to claim 1, wherein the object to be tested receives a part of every one of the first irradiating light to the fourth irradiating light to generate the first detection light to the fourth detection light, and the optical analysis system further comprises:
a second optical receiver, electrically connected to the control processing unit, and for use in receiving another part of every one of the first irradiating light to the fourth irradiating light, and thereby generating a first reference signal to a fourth reference signal, wherein the control processing unit generates the analysis results of the object to be tested according to the first reference signal to the fourth reference signal and to the first detection signal to the fourth detection signal.

20. The optical analysis system according to claim 17, wherein the variable gain amplification device further comprises a programmable resistor, and the programmable resistor changes the gain of the variable gain amplifier device via using the control processing unit.

21. A method for optical analysis, comprising:
a light source irradiation and detection light generating step (S01): providing a light source device comprising a first light-emitting unit and a second light-emitting unit, and using a control processing unit to control the light source device to emit a first irradiating light to a fourth irradiating light at a first time to a fourth time to respectively irradiate an object to be tested to respectively generate a first detection light to a fourth detection light, wherein the first light-emitting unit is driven by a first driving electric current and by a second driving electric current to respectively emit the first irradiating light and the second irradiating light, the second light-emitting unit is driven by a third driving electric current and by a fourth driving electric current to respectively emit the third irradiating light and the fourth irradiating light, a first peak wavelength to a fourth peak wavelength corresponding to the first irradiating light to the fourth irradiating light are different from one another, and a first wavelength range to a fourth wavelength range corresponding to the first irradiating light to the fourth irradiating light are different from one another, wherein the first time is not equal to the second time, and the third time is not equal to the fourth time; and
a detection light reception and analysis step (S03): using a first optical receiver to respectively receive the first detection light to the fourth detection light at the first time to the fourth time to generate the first detection signal to the fourth detection signal, and using the control processing unit to generate analysis results of the object to be tested according to the first detection signal to the fourth detection signal.

22. The optical analysis method according to claim 21, wherein in the light source irradiation and detection light generating step (S01), the first light-emitting unit illuminate at a first on-off frequency, and the second light-emitting unit illuminate at a second on-off frequency, wherein the first on-off frequency and the second on-off frequency are the same or different from each other, the first on-off frequency and the second on-off frequency are between 0.05 time/second and 50,000 times/second, and a time interval of the first on-off frequency and of the second on-off frequency for turning on the first light-emitting unit and second light-emitting unit is between 0.00001 second and 10 seconds.

23. The optical analysis method according to claim 21, further comprising:
a reference signal obtaining step (S02): using a second optical receiver disposed on a side of a shielding plate disposed between the light source device and the object to be tested and the side facing the light source device to receive a part of every one of the first irradiating light to the fourth irradiating light and thereby generating a first reference signal to a fourth reference signal;
wherein in the light source irradiation and detection light generating step (S01), another part of every one of the first irradiating light to the fourth irradiating light passes through a light transmission hole of the shielding plate to irradiate the object to be tested, and in the detection light reception and analysis step (S03), the control processing unit generates the analysis results of the object to be tested according to the first reference signal to the fourth reference signal and to the first detection signal to the fourth detection signal.

24. The optical analysis method according to claim 23, wherein in the detection light reception and analysis step (S03), the control processing unit which respectively divide the first detection signal to fourth detection signal by the first reference signal to the fourth reference signal calculates a first ratio to a fourth ratio, and generates the analysis results of the object to be tested according to the first ratio to the fourth ratio.

25. The optical analysis method according to claim 23, wherein in the detection light reception and analysis step (S03), the control processing unit is configured to a first gain to a fourth gain for use in amplifying the first detection signal to the fourth detection signal according to the first reference signal to the fourth reference signal, and a variable gain amplification device is used to amplify the first detection signal to the fourth detection signal according to the first gain to the fourth gain, and the control processing unit generates the analysis results of the object to be tested according to amplified the first detection signal to the fourth detection signal.

26. The optical analysis method according to claim 25, wherein the variable gain amplification device further comprises a programmable resistor, and in the detection light reception and analysis step (S03) the programmable resistor changes the gain of the variable gain amplifier device via using the control processing unit.

27. The optical analysis method as described in claim 21, wherein a full width at half maximum (FWHM) which at least one of the first peak wavelength to the fourth peak wavelength corresponds to is greater than 0 nm and less than or equal to 60 nm.

28. The optical analysis method as described in claim 21, wherein in the detection light reception and analysis step (S03), using a Fourier transform device to convert a time domain measurement signal of the object to be tested to a frequency domain measurement signal of the object to be tested, and the control processing unit obtains a spectral signal of the object to be tested to serve as the analysis results of the object to be tested after the control processing unit filters out noise from the frequency domain measurement signal of the object to be tested, wherein the first detection signal to the fourth detection signal form the time domain measurement signal of the object to be tested.

* * * * *